(No Model.)

W. BUNTING, Jr.
WATER CLOSET.

No. 465,609. Patented Dec. 22, 1891.

Witnesses
Geo. W. Breck.
Lillie F. Browning

Inventor
William Bunting Jr.
By his Attorney
Jacob Felbel

UNITED STATES PATENT OFFICE.

WILLIAM BUNTING, JR., OF BROOKLYN, ASSIGNOR TO THE MEYER-SNIFFEN COMPANY, LIMITED, OF NEW YORK, N. Y.

WATER-CLOSET.

SPECIFICATION forming part of Letters Patent No. 465,609, dated December 22, 1891.

Application filed February 17, 1891. Serial No. 381,751. (No model.)

*To all whom it may concern:*

Be it known that I, WILLIAM BUNTING, Jr., a citizen of the United States, and a resident of Brooklyn, in the county of Kings and State of New York, have invented certain new and useful Improvements in Water-Closets, of which the following is a specification.

My invention relates more particularly to earthenware closets wherein the trap and bowl are made integral or of a single piece, and has for its main object to provide a construction by which sewer-gas may be effectually excluded from the apartment in which the closet is located.
My invention consists in the features of construction and combinations of devices hereinafter more fully described, and particularly pointed out in the appended claims.

Figure 1:
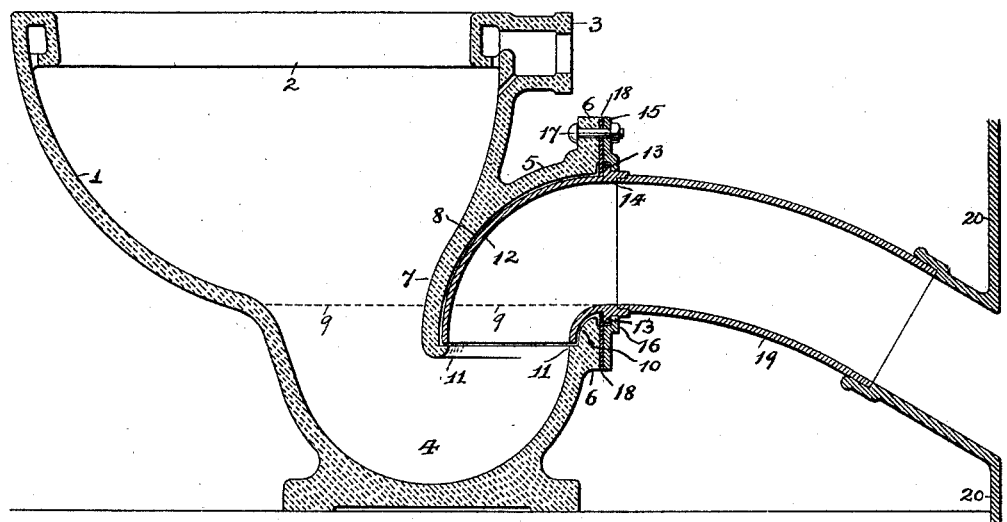
Figure 2:
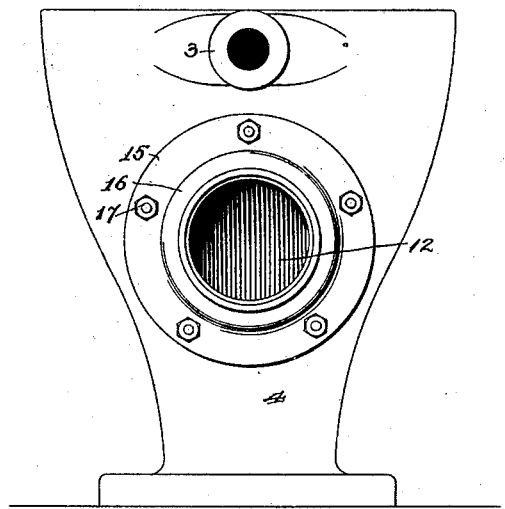

In the accompanying drawings, forming a part of this specification, Figure 1 is a central vertical section of a water-closet embodying my improvements, with a soil-pipe and branch or connection added, and Fig. 2 is a rear elevation of the same, omitting the soil-pipe and branch shown at Fig. 1.

In both views the same part will be found designated by the same numeral of reference.

The bowl 1 of the closet may be of any desired style or construction, and may be provided with the usual flushing-rim 2 and water-inlet 3. The trap portion 4 is made integral with the bowl, as is also the outgo 5, which terminates in a horizontal direction and in a vertical circular flange 6. The dip or partition 7 forms on one side one wall of the bowl and on the other one of the walls of the trap and one of the outgo. That wall or side 8 which forms one of the walls of the trap and outgo is constructed on an arc of a circle and in length extends for about a full quarter of a circle, beginning at a point within the trap below the water-line 9 and ending at the crown or extremity of the outgo above the water-line. The mouth or discharge end of the outgo is constructed at its lower side interiorly below the water-line, also on a curve or an arc of a circle, as at 10, so that the tubular outgo from the trap as a whole is substantially quadrantal in shape, and so that a section taken at any part of the outgo will present a substantially cylindrical figure.

Below the water-line, and within the trap and made integral therewith and with the dip or partition, is a circular horizontal lip or flange 11.

12 designates a ferrule or elbow, of brass or other metal or siutable material, made quadrantal in shape and of a size to match and fit into the outgo and extends down into the trap below the water-line thereof. The inner receiving end of said ferrule or elbow rests upon or terminates in the vicinity of and above the lip or flange 11, which is provided more particularly to avoid any obstruction to the free flowing of the contents of the trap and bowl by the lower projecting end of the elbow. The outer discharge end of said elbow is provided exteriorly with a circular rib 13 and interiorly with a circular shoulder 14. The elbow is connected to the closet by a clamping-ring 15, having a flange 16, which engages with the rib 13, the said clamping-ring being secured to the flange 6 of the outgo by means of bolts and nuts 17, the bolts passing through coincident perforations in the flange and the ring.

In order to prevent any leakage of water from the trap suitable packing 18 is introduced between the clamping-ring and the flange of the outgo, which packing may extend up to the base of the rib on the elbow, as shown, and, if desired, additional packing may be applied between the lip 11 and the downwardly-projecting end of the elbow. To the shouldered end of the elbow is fitted a pipe-section 19 in a manner to provide interiorly a smooth flush joint. The connection may be made secure and air-tight by means of solder or otherwise. The opposite end of the pipe-section may be calked or screwed into the soil-pipe 20. The pipe-section and the elbow may, so far as the main feature of my invention is concerned, be made of one piece of material or integral, and the pipe-section may be bent in any direction to properly connect with the soil-pipe. By my construction the joint between the pipe or elbow and the trap or outgo is located below the water-level of the trap, so that any backflow of gas from the sewer connections will be prevented from escaping at said joint by reason of the intermediate body of water in the trap.

By my invention the clamping-ring is used merely to hold the pipe-sections to the closet, and is not relied upon to make a gas-proof joint, the joint at the receiving end of the outlet or discharge pipe being arranged or located within the water of the trap. The pipe-sections, being of metal, may be soldered, calked, or screwed together, and their joints may be made durable and absolutely secure.

I do not claim to be the first to make a gas-proof joint between an earthenware trap and a metal discharge-pipe by means of a water seal, but only to carry out this idea in the manner and by the particular construction and arrangement of means set forth in the following claims, by which an improved and more desirable water-closet structure is produced.

What I claim as new, and desire to secure by Letters Patent, is—

1. The combination, with a water-closet bowl, trap, and outgo made from a single piece of earthenware, the outgo 5 thereof being formed on a quarter-circle and terminating in a horizontal direction and in a vertical circular flange 6, of a metallic elbow or outlet-pipe, also formed on a quarter-circle and inserted in the outgo in a manner to have its receiving end located below the water-line of the trap, and a clamping-ring engaging the outer end of the elbow or outlet-pipe and connected to said vertical circular flange, as set forth.

2. The combination, with a water-closet bowl, trap, and outgo made from a single piece of earthenware, the outgo 5 thereof being formed on a quarter-circle and terminating in a horizontal direction and in a vertical circular flange 6, of an elbow or outlet-pipe, also formed on a quarter-circle and inserted in the outgo in a manner to have its receiving end located below the water-line of the trap, said elbow or outlet-pipe having at its outer end a circular rib 13, a clamping-plate having a flange 16 to engage said rib and connected to the vertical circular flange 6 of the outgo, and a packing-ring arranged between the vertical circular flange 6 and the clamping-ring, as set forth.

3. A water-closet bowl, trap, outgo, and dip or partition, all made from a single piece of earthenware, the dip or partition 7 forming on one side one wall of the bowl and on the other side one of the walls of the trap and one of the outgo, and the said outgo being constructed of a quadrantal shape and terminating in a horizontal direction and with a vertical circular flange, as set forth.

4. The combination, with a water-closet bowl, trap, outgo, and dip or partition, all made from a single piece of earthenware, the dip or partition forming on one side one wall of the bowl and on the other side one of the walls of the trap and one of the outgo and the outgo being of a quadrantal shape and having at its receiving end a horizontal lip or flange of earthenware and terminating in a horizontal direction and with a vertical circular flange, of an elbow or outlet-pipe of quadrantal shape inserted within said outgo below the water-line of the trap and in proximity to said horizontal lip and having at its outer end a vertical circular rib 13 and a circular shoulder 14, a clamping-ring engaging said rib 13 and coupled to the vertical circular flange 6, a packing-ring between the clamping-ring and the circular flange 6, and a pipe-section 19, connected at one end to the outer end of the elbow 12 at the shoulder 14 and at the other end to a soil-pipe, as set forth.

Signed at New York city, in the county of New York and State of New York, this 9th day of February, A. D. 1891.

WILLIAM BUNTING, Jr.

Witnesses:
RICHARD LANKENAN,
AMASA T. DAY.